Aug. 30, 1927.
R. D. EVANS
1,640,539
TRANSMISSION SYSTEM
Filed April 26, 1923
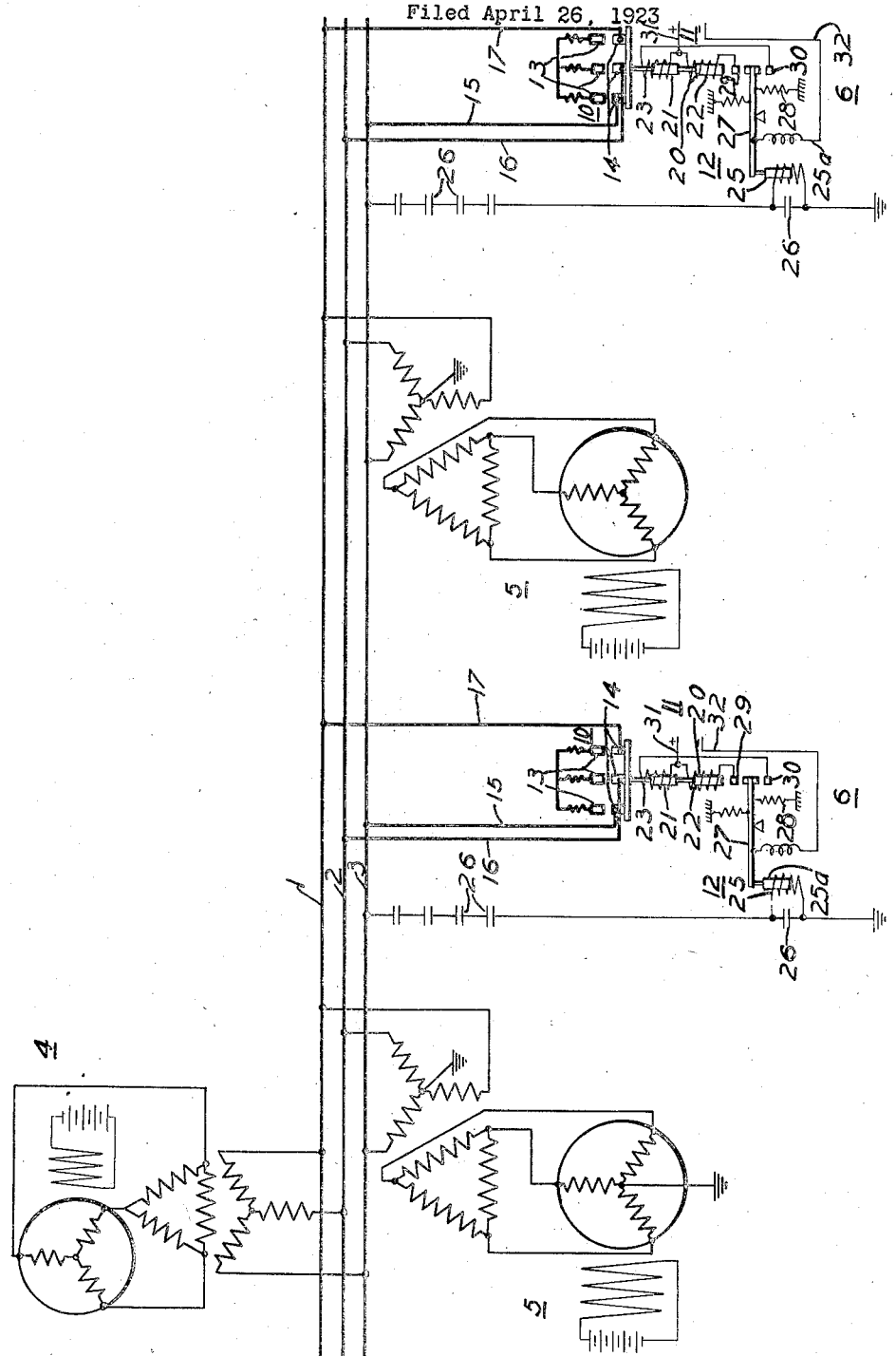
WITNESSES:
Thomas H. English.
W. Rooley
INVENTOR
Robert D. Evans.
BY
Wesley G. Carr
ATTORNEY Patented Aug. 30, 1927.

1,640,539

UNITED STATES PATENT OFFICE.

ROBERT D. EVANS, OF WILKINSBURG, PENNSYLVANIA, ASSIGNOR TO WESTINGHOUSE ELECTRIC & MANUFACTURING COMPANY, A CORPORATION OF PENNSYLVANIA.

TRANSMISSION SYSTEM.

Application filed April 26, 1923. Serial No. 634,750.

My invention relates to electrical power transmission lines or systems and, particularly, to those for the transmission of power at high voltages over long distances.

In a copending application of Frank G. Baum, Serial No. 569,704, filed June 20, 1922, and patented Feb. 8, 1927, Patent No. 1,617,007 there is shown a system that is particularly adapted for high-voltage, long-distance transmission of electrical power, this superpower system embodying a plurality of synchronous condensers spaced along the line at suitable intervals and adapted to provide the wattless current required in each section of the line between condenser stations, whereby a substantially constant voltage may be maintained throughout a relatively long transmission line.

In the recent past, the transmission of power at 220,000 volts has become a reality and it is probable that, in the future, most long-distance systems—say of the order of 200 miles up—will employ this or a higher voltage. Such systems, especially if in the nature of trunk-line systems, have come to be generally known as superpower systems and are herein described as relatively long-distance and relatively high-voltage transmission systems.

In the event of failure of one of these condenser stations, or from other causes, an abnormal rise in voltage may occur, and it is the object of my present invention to provide automatic means for connecting a reactor device across the line to arrest such abnormal voltage changes therein.

More specifically stated, it is the object of my invention to provide, in connection with a long-distance, high-voltage, three-phase transmission system, a three-phase reactor device which is adapted to be connected across the line whenever abnormally high or low voltages occur in the superpower transmission line under any emergency condition.

Other objects of my invention will become evident from the following detailed description, taken in conjunction with the accompanying drawing, wherein the single figure is a diagrammatic view of a system of transmission and distribution organized in accordance with my present invention.

Referring to the drawings, the system here shown comprises a relatively high-voltage, long-distance transmission line including conductors 1, 2 and 3, which may be energized at suitable points from a number of generating stations, such as that designated 4. At intervals along the line, a plurality of synchronous condenser stations 5 are connected to thus divide the line into relatively short sections and provide each section with the requisite amount of wattless current to maintain the voltage of the line substantially constant under normal operating conditions, as more fully set forth in the above-identified copending application.

At the end of the line remote from a generating station 4, or at any intermediate points on the line where it is deemed desirable, I provide a preferably quick-acting protective device 6, which is normally inactive.

Each protective device 6 may comprise a three-phase preferably inductive reactor 10 that is adapted to withstand the emergency voltage conditions that may arise, as previously set forth. A switching device 11 is adapted to close the circuit of the reactor device 10 and is in turn controlled by a balancing relay 12. The three-phase reactor device 10 is shown as provided with three suitable stationary terminals 13, which are adapted to be engaged by three corresponding terminals 14 of the switching device 11, when occupying its upper or closed position. The movable terminals 14 are connected to the respective transmission-line conductors 1, 2 and 3 by conductors 15, 16 and 17.

The switching device 11 may comprise a plurality of independent core or armature members 20 and 21, around which two suitable actuating coils 22 and 23 are respectively disposed, for the purpose of lifting the switching device 11 into its closed position whenever either of the actuating coils 22 and 23 becomes energized.

The balancing relay 12 may be of any familiar type and is here shown as comprising an actuating coil 25 that is permanently connected across, and energized from, a condenser, or the like, 26, a series of which condensers are connected between one of the transmission-line conductors and ground. The coil 25 is wound around a suitable core 25a, which is attached to one end of a balancing lever 27, the opposite end of which is biased to the illustrated intermediate or open position by means of a spring 28. The said opposite end of the lever 27 is provided with suitable contact members for respectively engaging stationary contact members 29 and 30 in the lower and the upper limiting positions of the lever 27, corresponding to low-voltage and high-voltage conditions, respectively, on the transmission line.

I desire it to be understood that the protective apparatus shown is illustrative only and that, preferably, a quick-acting or high-speed protective device of any suitable type is to be employed.

The operation of my invention may be set forth as follows: In the event of failure of one of the condenser stations 5 and a consequent current or voltage surge upon the high-voltage line, the actuating coil 25 of one or more of the illustrated balancing relays 12 will become sufficiently energized, by reason of the changing voltage of the condenser 26 across which the coil is connected, to actuate the lever 27 to its upper position.

In this case, an auxiliary circuit is established from a suitable low-voltage supply conductor 31 through the actuating coil 22 of the switching device 11, stationary contact member 30, which engages the movable contact member of the balancing relay 12, and thence through the lever 27 to negative supply-circuit conductor 32. The switching device 11 is thus raised to its upper position to cause engagement between the pairs of contact members 13 and 14, whereby the three-phase reactor device 10 is connected directly across the main transmission line. It will be understood that, in this way, the rise in voltage upon the transmission line is maintained within predetermined safe limits, and any possibility of self-excitation of the generators is also precluded.

More specifically stated, the shunt inductive reactor device 10, when connected to the transmission line, draws a heavy lagging current, which action tends to produce a voltage drop to thereby decrease the line voltage. Moreover, the addition of this shunt reactor tends to reduce the leading current required by the generator, thus decreasing any tendency of the generator to become self-exciting.

In the event of abnormal low-voltage conditions upon the transmission line for any reason, the energization of the actuating coil 25 of the balancing relay 12 is reduced to such value that the opposing spring 28 predominates, and engagement of the stationary contact member 29 with the movable contact member of the relay 12 is thus effected. Consequently, the actuating coil 23 of the swithing device 11 is energized to effect closure thereof and thus again connect the three-phase reactor device across the line to reduce the range of voltage variation thereon, or, in other words, to tend to equalize voltage conditions in the emergency.

It will be understood that, in the case of a completely equipped high-voltage transmission system, the shunt reactor device 10 need not have a long-time rating, since the abnormal conditions responsible for the voltage surges would probably be remedied by an operator at the defective condenser station by connecting a spare condenser unit to the line, for example. Furthermore, in case power is supplied to the transmission line at a number of points, the reactor devices might be loaded upon the secondary windings of the illustrated step-down transformers in the condenser stations 5 rather than across the transmission line itself.

It will be seen that I have thus provided a relatively simple means that is particularly adapted for automatically preventing abnormal changes in a superpower system: that is, upon a long-distance high-voltage transmission line under the emergency conditions set forth.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. The combination with a three-phase transmission line, of a generator for supplying energy thereto, a normally inactive three-phase reactor device, a switching device for connecting said reactor device across said line, and means for effecting the actuation of said switching device in the event of abnormally high or abnormally low voltage of the line.

2. The combination with a three-phase transmission line, of a generator for supplying energy thereto, a normally inactive three-phase reactor device, a switching device for connecting said reactor device across said line, a capacitance device energized from the line, and means having an actuating coil connected across said capacitance device for effecting the actuation of said switching device in the event of abnormally high or abnormally low voltage of the line.

3. The combination with a polyphase transmission line, of a dynamo-electric machine for normally controlling the voltage thereof, a normally inactive polyphase reactor device, a switching device for connecting said reactor device across said line, and means for effecting the actuation of said switching device in the event of abnormally high or abnormally low voltage of the line.

In testimony whereof, I have hereunto subscribed my name this 23rd day of April 1923.

ROBERT D. EVANS.